Nov. 9, 1954    H. D. CUMMINS    2,693,725

METHOD OF MAKING METAL CUTTING TOOLS

Filed March 3, 1947

INVENTOR,
HARRY D. CUMMINS
BY
ATTORNEY

United States Patent Office 2,693,725
Patented Nov. 9, 1954

2,693,725

METHOD OF MAKING METAL CUTTING TOOLS

Harry D. Cummins, Pasadena, Calif., assignor, by mesne assignments, of sixty per cent to Thomas H. Coffey, La Crescenta, Calif., and forty per cent to William Douglas Sellers Application March 3, 1947, Serial No. 732,010

9 Claims. (Cl. 76—108)

The present invention relates to metal cutting tools in general and particularly to a method of making cutting tools adapted for cutting extremely hard metal.

In the making of tools, machines, dies and other structures and apparatuses, it is frequently necessary and essential to form apertures, holes, seats and bores in metal. In certain instances, the metal is extremely hard, a characteristic which varies with the heat treatment to which it has been subject and with its chemical composition, as was pointed out in the earlier application Serial No. 677,707, filed June 19, 1946, now Patent 2,575,332, granted November 20, 1951, of which the present application is a continuation-in-part. Drills heretofore in use have been incapable of cutting certain metals at a reasonable cutting rate without exploding or breaking due to the strains set up and the heat generated. Also these drills did not have sufficient strength to enable them to cut extremely hard metals. Such drills were of the type formed with a steel shank cut out at the end to receive a tungsten alloy insert secured in place by silver solder. In certain instances the cutting edge would be brazed in place but at temperatures of 600 degrees F., which would frequently be generated in the use of the tool, the bronze or brass of the braze would become granular and disintegrate. Such tools were incapable of cutting high carbon steels, high speed steels and their alloys, and their usefulness has been specified for ceramics and non-ferrous metals.

It is an object of the present invention to provide a new and improved method of making metal cutting tools in which tungsten carbide is welded to the steel body of the tool in a permanent manner unaffected by heat generated in tool use.

It is another object of the invention to provide a new and improved method of making a drill in which a tungsten carbide cutting element is welded to a steel shank to produce a drill capable of cutting extremely hard metal using only water as a coolant.

It is still another object to provide a new and improved method of making a superior metal cutting tungsten carbide tipped drill.

It is a further object of the invention to provide a new and improved method of making a superior metal cutting drill.

A still further object of the invention is to provide a superior method for permanently securing tungsten carbide to steel.

Another object of the invention is to provide a process for welding tungsten carbide to steel.

These and other more specific objects will appear upon reading the following specification and claims and upon considering in connection therewith the attached drawing to which they relate.

Referring now to the drawing in which a preferred embodiment of the invention is illustrated:

Figure 4:
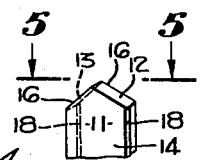
Figure 4 is a side view showing the cutting tip and the arrangement of its cutting edge.
Figure 5:
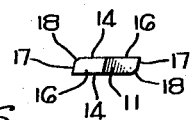
Figure 5 is an end view of the cutting tip looking in the direction of the arrows upon the line 5—5 of Figure 4.

Referring again to the drawing, a preferred form of drilling tool constructed in accordance with the present invention is illustrated and is seen to comprise a cutting tip 11 of tungsten carbide. The end of tip 11 is formed with two faces 12 and 13 which are angularly related and the planes of which intersect the planes of the side faces 14 of the tip at slightly less than a right angle to provide raised cutting edges 16 upon opposite sides of the tip. The element is adapted to rotate in one direction with the edges 16 leading and to prevent any possible binding the edges 17 are inclined from the perpendicular relative to flat sides 14 and are bevelled off at 18 along their trailing corners. The inner end 19 of tip 11 is inclined to make an angle of substantially 45 degrees with the side faces 14 for a reason which will be described. The angular relationships of the sides and edges of the tip are best shown in Figures 4 and 5, the angularity of inner end 19 being shown in several figures, including Figure 5.

The tip 11 is welded, in the sense of being molecularly bonded as distinguished from brazed, to a shank 21 which is preferably of a high grade carbon steel cylindrical in section at its outer end so as to be adapted to seat in the chuck of a drilling machine. Opposed sides of the shank are shaped, as by grinding, to form converging side walls 22 which are joined by an outer angularly extending end 23 which intersects a medial longitudinal plane through the shank at an angle of about 45 degrees, as illustrated clearly in Figure 3. The sloping ends 19 and 23 of the tip and shank, respectively, abut or substantially abut in a manner shown in Figure 3 in the finished product, the longitudinal axes of the tip and the shank being coincident.

Figure 6:
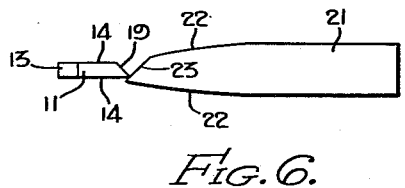
Figure 6 is a diagrammatic showing of the first step in the process of constructing a drill in accordance with the present invention.
Figure 7:
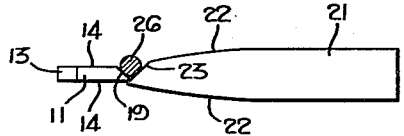
Figure 7 is a diagrammatic showing of the second step of the process illustrating the initial positioning of the welding metal.
Figure 10:
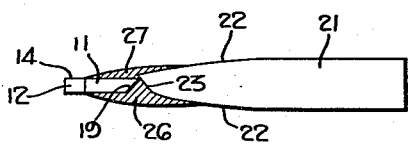
Figure 10 is a diagrammatic showing of the fifth step in the process and illustrates the relationship of tip, shank and welding material at the end of the welding operation.

The steps of the operation of joining tip 11 to shank 21 by welding are illustrated diagrammatically in Figures 6 and 10, inclusive. The tip 11 is brought into juxtaposition to shank 21 as shown in Figure 6, a welding flux of any common type applied, and the temperature of the parts raised as by an oxy-acetylene torch. The welding metal comprises Monel metal having the following composition: 67% nickel, 28% copper, 5% iron, manganese and silicon combined. Metal having the following composition also may be used: 67% nickel, 30% copper, 1.4% iron, 0.14% manganese, 0.1% sulphur, 0.1% silicon, 1.0% silver and 0.26% carbon. This welding metal is dropped at the junction of the tip end of the shank, as illustrated in Figure 7.

Heat is applied in the welding operation as by an oxy-acetylene flame, the hottest flame preferably being used, which is understood to have a temperature of approximately 4000 degrees F. The flame is directed to the tip and to the shank, being largely directed against the tip, with the welding metal rod held above the scarf formed by the inclined surfaces 19 and 23. The temperature of the steel shank is raised by the heat applied to it and to the adjacent tip until its surface approaches a molten stage, which may be somewhere within the range of 2400 degrees F. to 2800 degrees F. The tungsten carbide, of course, is not melted but if the adjacent rod of welding material is lowered nearer to the flame it is melted and the body 26, illustrated clearly in Figure 7, is deposited in the scarf. This deposited body of welding material may be ball-like, as illustrated, and as the acetylene flame continues to ply heat to it and to the adjacent elements, and as additional material is added, it flows over the tip and over the shank and into the form illustrated in Figure 8.

Figure 9:
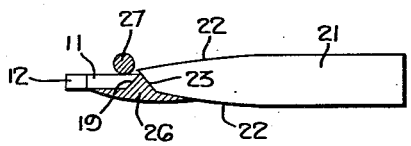
Figure 9 is a diagrammatic showing of the fourth step in the process showing the positioning of the welding metal upon the reverse side of the drill.

The withdrawal of the heat permits the parts to cool, the welding metal forming a welded bond between the shank and the tip. The same operation is then performed upon the opposite side of the tool as illustrated in Figures 9 and 10, the welding material there being indicated by the reference character 27. The intersecting planes of the ends 19 and 23 of the tip and the shank together with the sloping walls 22 of the shank and the flat tip walls 14 provide a plurality of angularly related welded surfaces lying in a plurality of planes to resist stresses which may be provided by forces in any direction. It is interesting to note that in the welding of the second side the weld metal is not displaced from the side first welded. This apparently is due to an affinity which exists after the welding operation has been performed.

As in all welding operations it is preferable that a flux be used to remove oxidation which occurs rapidly at the high temperatures used and to prevent the formation of such oxides. This protecting flux, which may be any of the well known commercial varieties, is preferably applied to the surfaces to be welded before the welding material is deposited thereon, may be used during the operation in the addition of additional welding material, and can also be applied to the welded surface after all of the welding material has been deposited and while still at high heat temperature, if desired, and to prevent the formation of oxide upon the under side of the shank and tip when the upper side thereof is being welded, as illustrated in Figures 7 and 8, flux can be applied to the under surfaces as well as to the upper surface before the deposition of welding material.

Figure 8:
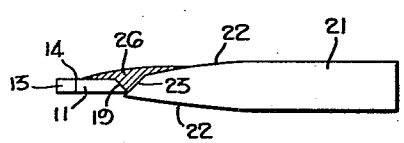
Figure 8 is a diagrammatic showing of the third step in the process showing a subsequent form assumed by the welding material.

If preferred the second or under side, as viewed in Figures 6, 7 and 8, can be welded before the welding of the upper side has been completed. That is, after the upper surface has been welded together, and before all the desired welding material has been positioned thereon, the drill can be turned over and the under side welded to substantially the same condition. Additional welding material can then be added to both sides.

The process involving work upon the under side before completing the work upon the top side comprises the following specific operational steps:

1. Heat is applied to the tip and to the shank, related as illustrated in Figure 6, the heat being applied largely to the tip although being played upon both tip and shank. The hottest welding flame available with oxy-acetylene is used and the temperature is raised to the range of 2400 degrees F. to 2800 degrees F. Welding flux is applied to the upper and lower surfaces during this step.

2. The body of welding material 26 is deposited in the scarf from the welding rod and additional material is added until the relationship approximates that illustrated in Figure 8, less welding material being present. Protecting flux can again be added to the weld.

3. Heat is applied to the under surface, the drill being reversed to the position illustrated in Figure 9, and the parts brought up to the temperature range stated at which time the body 27 of welding material is deposited thereon and flows thereover. Before all the desired welding material has been added the flux can again be flowed thereover to prevent oxidation.

4. The unit is again reversed so that it is positioned as illustrated in Figure 8, is brought up to the temperature range stated, and additional welding material added.

5. The unit is again reversed to the position shown in Figure 10 and the quantity of welding material supplemented after the unit has again been heated.

The free use of welding flux is in accordance with standard practice and is desirable in that it prevents the inclusion of oxides in the weld and insures that every weld will be a good weld.

Figure 1:
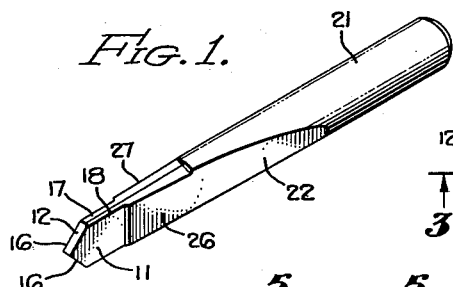
Figure 1 is a view in perspective of the drill constructed in accordance with the present invention.
Figure 2:
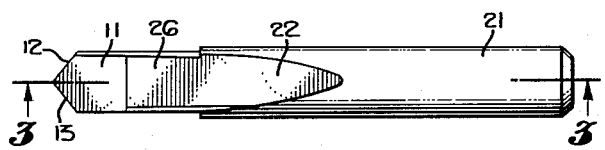
Figure 2 is a top plan view of the drill illustrated in Figure 1.
Figure 3:
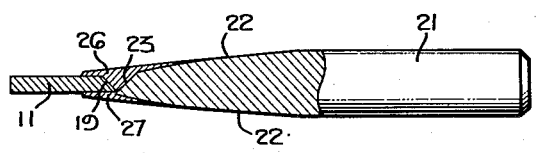
Figure 3 is a partial longitudinal section upon the line 3—3 of Figure 2.

The tool is completed by grinding so as to flatten the welds 26 and 27 as to give them the contours illustrated in Figures 1, 2 and 3, in which they are seen to form substantially flat continuations of the converging walls 22 of the shank to a point on the tip 11 forward of its sloping end wall 19. If preferred the cutting edges of the tungsten carbide tip 11 and the angular relationship of its faces, as described above, can be given to it after the drill has been welded rather than before assembly.

In its final form the cutting tip 11 and the shank 21 form an integral unitary construction as distinguished from metal-cutting drills heretofore used in which the cutting element was secured to the shank in a relatively insecure manner and was subject to breakage under unexpected stresses and to disrupting explosive forces caused by excessive heat. It is believed that the high temperatures used upon the tungsten carbide make it possible for the welding material actually to enter into the material itself and to form a bond therewith as distinguished from a mere "tinning" action which characterized all methods of securing tungsten carbide to metals which have heretofore been used.

In operation the tool constructed in accordance with the present invention is adapted to have its cylindrical shank 21 seated in the chuck of a drilling machine and to be rotated in a direction to advance its cutting edges 16 into the work. The angularity of the cutting end is such that there is a minimum of binding action resulting from chips and the tool is sufficiently strong as to permit the use of clear water as a coolant instead of the relatively expensive coolants now used in drilling operations in hard metals. The use of the particular welding material described has been found to be most effective and to provide a superior construction and one in which the junction of the tip and shank does not form a weak link which must be protected by careful use as in structures heretofore known. As a matter of fact it has been found that the drills will withstand a temperature higher than the melting point of the welding metal itself. This apparently is due to some reaction which takes place in the welding metal from its close association with the tungsten carbide or from its contact with the gas given off by it at the high welding temperature. It is true to say that this drill is capable of cutting any metal which is known to be used commercially and in all instances in which other drills can be used the present drill will cut at a greater rate of speed. In fact the present drill can be used to drill holes through any high speed drill or tool bit now known.

The welding method herein disclosed and claimed as applicable to other devices than to drills and the use of the process in drills comprises merely a preferred application of generic invention.

While the particular apparatus and method herein shown and described in detail are fully capable of attaining the objects and providing the advantages hereinbefore stated, it is to be understood that they are merely illustrative of the presently preferred embodiments of the invention and that no limitations are intended as to the details other than as defined in the appended claims.

I claim:

1. A method of making a metal-cutting drill capable of withstanding the effect of heat generated by its own drilling action comprising the step of forming an inclined inner end on a metal-cutting tip, forming an inclined inner end upon a metal shank, bringing said tip and said shank together to abut along a single line depositing a ball of welding metal upon said tip, raisnig the temperature of said tip to approximately 2800 degrees F. to cause said ball to flow over the adjacent surface of said tip and shank, depositing a ball of welding metal upon said tip and shank upon the reverse side of said line of contact, again raising the temperature of said tip to approximately 2800 degrees F. to cause said ball to flow over the adjacent surface of said tip and shank.

2. The method recited in claim 1 characterized in that said welding metal comprises 67% nickel, 28% copper and 5% iron, manganese and silicon combined.

3. The method recited in claim 1 characterized in that said welding metal comprises 67% nickel, 30% copper, 1.4% iron, 0.14% manganese, 0.1% sulphur, 0.1% silicon, 1.0% silver, and 0.26% carbon.

4. The method of welding tungsten carbide metal-cutting elements to steel to provide a bond capable of withstanding the maximum heat generated by the cutting element in use comprising bringing into single line contact separate elements of steel and tungsten carbide, heating said elements to raise the temperature of said tungsten carbide to approximately 2800 degrees F. and the surface of the steel element substantially to its melting point, and melting a body of welding material comprising approximately 67% nickel, 28% copper and 5% iron, manganese and silicon combined between said elements at said temperature.

5. The method of welding a tungsten carbide metal-cutting element to steel to form a bond capable of withstanding the maximum heat generated by cutting metal with said element comprising the steps of bringing into single line contact separate elements of steel and tungsten carbide, applying heat to said elements at adjacent surfaces to raise the temperature of said tungsten carbide to the range of 2400 to 2800 degrees F. and the surface of the steel element substantially to its melting point, and then melting a welding material into a body in the presence of said heat to fuse said material with said elements and to form a body thereof therebetween, said welding material comprising 67% nickel, 28% copper and 5% iron, manganese and silicon combined.

6. The method of welding a tungsten carbide metal-cutting element to steel to form a bond capable of withstanding the maximum heat generated by cutting metal with said element comprising the steps of bringing into juxtaposition separate elements of steel and tungsten carbide, applying heat to said elements but primarily to said tungsten carbide element at adjacent surfaces to raise the temperature of said tungsten carbide element to a temperature higher than 2400 degrees F. and to bring the surface of the steel element substantially to its melting point, and then melting a welding material in the presence of said heat into a body fused with said elements and extended therebetween, said welding material comprising 67% nickel, 30% copper, 1.4% iron, 0.14% manganese, 0.1% sulphur, 0.1% silicon, 1.0% silver and 0.26% carbon.

7. The method of welding a tungsten carbide cutting element to steel to form a bond capable of withstanding the maximum heat generated by cutting metal with said element comprising the steps of bringing into juxtaposition separate elements of steel and tungsten carbide, heating said elements by the application of heat primarily to said tungsten carbide element until the latter is at a temperature higher than 2400 degrees F., and welding said elements together by flowing thereover and therebetween a welding material comprising 67% nickel, 28% copper, and 5% iron, manganese and silicon combined.

8. The process of joining two aligned adjacent elements, one of steel and one comprising a tungsten carbide metal-cutting element to form a bond capable of withstanding the maximum heat generated by cutting metal with said element, comprising the following steps: applying heat from an oxy-acetylene flame to said elements at adjacent surfaces, said flame playing principally upon said tungsten carbide element to prevent excessive temperatures in said steel and to raise said tungsten carbide element to at least 2400 degrees F., melting a body of welding material comprising approximately 67% nickel, 28% copper and 5% iron, manganese and silicon combined onto one side of said elements and therebetween with the surface of said steel element substantially at its melting point, playing said flame largely upon the reverse side of said tungsten carbide element and raising the adjacent surface of said steel element substantially to its melting point, and then melting additional welding material onto said reverse side of said tungsten carbide element and over said adjacent surface of said steel element.

9. The method of welding a tungsten carbide cutting element to steel to form a bond capable of withstanding the maximum heat generated by cutting metal with said element comprising the steps of bringing into juxtaposition separate elements of steel and tungsten carbide, raising the temperature of said elements in the presence of a welding material positioned between them, said welding material comprising approximately 67% nickel and 28% copper until said tungsten carbide cutting element is at a temperature in the range of 2400 degrees F. to 2800 degrees F. approximately, to enable said welding material to become bonded to said elements, and allowing said elements to cool to room temperature.

References Cited in the file of this patent

UNITED STATES PATENTS

| Number | Name | Date |
|---|---|---|
| 965,587 | Lassiter | July 26, 1910 |
| 1,733,241 | Scott | Oct. 29, 1929 |
| 1,847,302 | Emmons | Mar. 1, 1932 |
| 1,855,330 | Zublin | Apr. 26, 1932 |
| 1,859,978 | Metzger | May 24, 1932 |
| 1,886,835 | Purnell | Nov. 8, 1932 |
| 1,901,654 | Kerr | Mar. 14, 1933 |
| 1,948,489 | Balke | Feb. 27, 1934 |
| 2,057,209 | Schlumpf | Oct. 13, 1936 |
| 2,089,481 | Howard | Aug. 10, 1937 |
| 2,148,925 | Bochy | Feb. 28, 1939 |
| 2,170,164 | Stone et al. | Aug. 22, 1939 |
| 2,308,569 | St. Clair | Jan. 19, 1943 |
| 2,337,322 | Gascoigne | Dec. 21, 1943 |
| 2,384,204 | St. Clair | Sept. 4, 1945 |

OTHER REFERENCES

Metals Handbook, 1939 edition, page 909. Published by American Society for Metals, Cleveland, Ohio. Copy in Div. 14.

The Oxy-Acetylene Handbook, 1945, pages 369–371 and 383. Published by Linde Air Products Co., New York, N. Y. Copy in Div. 14.